United States Patent
Mundt et al.

(10) Patent No.: US 8,896,754 B2
(45) Date of Patent: Nov. 25, 2014

(54) INFORMATION HANDLING SYSTEM INTEGRATED CAMERA LENS COVER

(75) Inventors: Kevin Mundt, Austin, TX (US);
Ernesto Ramirez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 165 days.

(21) Appl. No.: 13/253,740

(22) Filed: Oct. 5, 2011

(65) Prior Publication Data

US 2013/0088639 A1    Apr. 11, 2013

(51) Int. Cl.
*H04N 5/225* (2006.01)
*H04N 5/232* (2006.01)
*G03B 11/04* (2006.01)

(52) U.S. Cl.
CPC ............ *H04N 5/2251* (2013.01); *H04N 5/232* (2013.01); *G03B 11/043* (2013.01)
USPC ................... 348/373; 348/207.99; 348/14.01

(58) Field of Classification Search
CPC ............. H04N 5/2251–5/2254; H04N 5/2257
USPC .......... 348/373–375, 333.01, 14.01; 396/506; 49/373
See application file for complete search history.

(56) References Cited

U.S. PATENT DOCUMENTS

| | | | |
|---|---|---|---|
| 5,953,048 A * | 9/1999 | Mikami et al. | 348/14.01 |
| 6,812,958 B1 * | 11/2004 | Silvester | 348/207.1 |
| 7,563,041 B2 * | 7/2009 | Kang | 396/506 |
| 7,619,654 B2 * | 11/2009 | Ito et al. | 348/208.12 |
| 2005/0068423 A1 | 3/2005 | Bear et al. | |
| 2007/0146540 A1 * | 6/2007 | Sasano | 348/372 |
| 2009/0295984 A1 * | 12/2009 | Kawai et al. | 348/373 |
| 2011/0058255 A1 | 3/2011 | Weiss | |
| 2011/0099908 A1 * | 5/2011 | Fortmann | 49/373 |

FOREIGN PATENT DOCUMENTS

JP     2003189163 A  *  7/2003

* cited by examiner

*Primary Examiner* — Tuan Ho
*Assistant Examiner* — Zhenzhen Wu
(74) *Attorney, Agent, or Firm* — Terrile, Cannatti, Chambers & Holland, LLP; Robert W. Holland

(57) ABSTRACT

Inadvertent or malicious viewing of an information handling system end user by an integrated camera is prevented with a mechanical shutter that actuates to selectively impede transmission of light to the camera. Mechanical blocking of the camera lens prevents malicious code from hijacking the operation of the camera and provides a visual indicator that capturing images is impeded with the lens physically blocked. In one embodiment, actuating the mechanical shutter also powers down the camera.

7 Claims, 2 Drawing Sheets

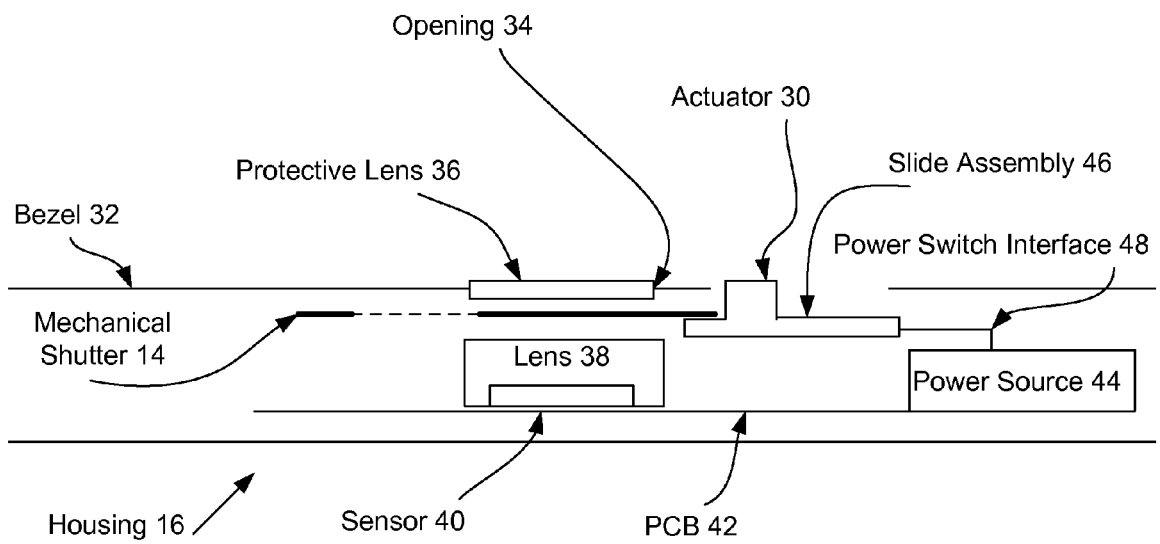
*Figure 2*
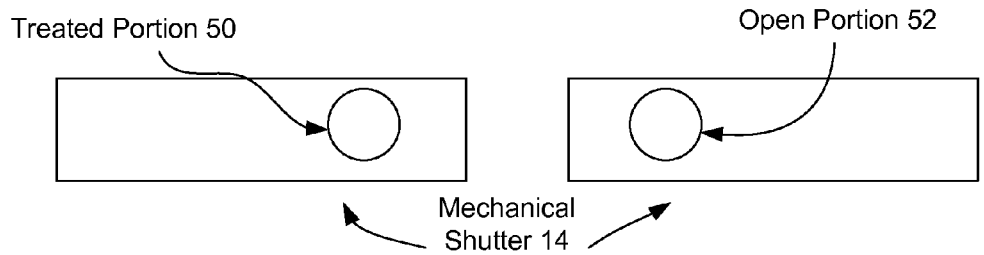
*Figure 3A*  *Figure 3B*
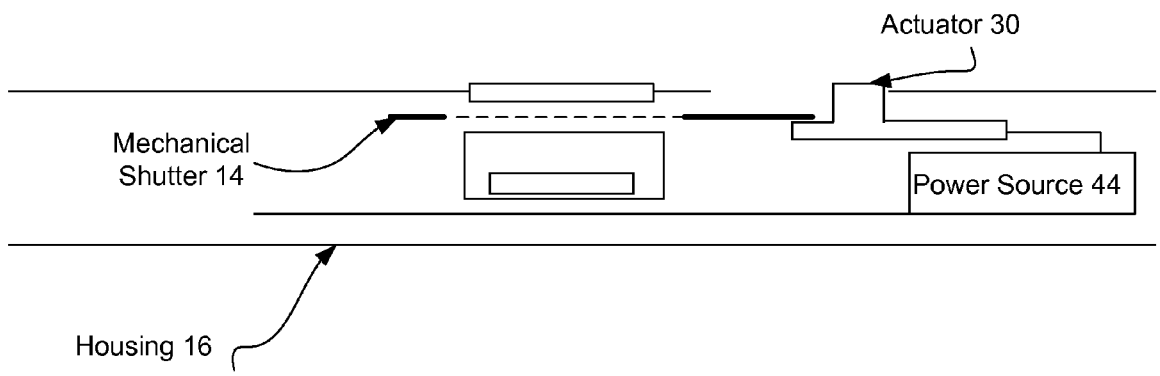
*Figure 4*

INFORMATION HANDLING SYSTEM INTEGRATED CAMERA LENS COVER

BACKGROUND OF THE INVENTION

1. Field of the Invention

The present invention relates in general to the field of information handling system cameras, and more particularly to an information handling system integrated camera lens cover.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have become a preferred communication tool for many end users. Two of the factors that have made information handling systems a preferred communication tool are the convenience available from portable information handling systems and the relatively large bandwidth available for communication through wireless networks, such as wireless local area network (WLAN) hotspots and wireless wide area networks (WWAN) available through cell phone providers. End users communicate through e-mails, text messages and multimedia information. For example, social networking sites allow end users to post images and videos for download and viewing by friends. Broadband network communications support direct video conferencing between information handling systems with video and audio information captured at each information handling system. Many portable information handling systems integrate a video camera and microphone to aid video conferencing. For example, some portable information handling systems integrate a video camera in a bezel that contains an LCD screen so that the end user's image is captured as the end user views information presented at the LCD.

One difficulty with user-facing video cameras is that end users might inadvertently turn on the video camera to capture and send images of inopportune or embarrassing moments. For example, an end user might walk in front of an active video camera transmitting over the Internet in a state of undress. Another difficulty with a user-facing video camera is that a hacker or malicious code in control of the information handling system might activate the video camera without the knowledge of the end user. Sophisticated hackers eliminate indications of operation of a video camera at an information handling system, such as by shutting off an LED indicator illuminated by the video camera when capturing images during normal operating conditions. Early web cameras designed to attach to a display as an external peripheral did include a shutter to block a lens and prevent the camera from capturing images; however, integrated cameras found in modern portable information handling system housings have size limitations that prevent the use of a conventional mechanical shutter. The thickness of a portable information handling system display housing is generally based upon LCD panel and backlight thickness so that the overall system size can remain as thin as possible. Conventional video cameras integrated in a portable information handling system housing typically use all available thickness so that the lens assembly is as large as possible. A larger lens assembly allows larger optics that capture greater amounts of light for higher quality images, particularly in low light environments. Typically an end user will prefer the largest lens assembly that will fit in the space available of a portable information handling system housing.

SUMMARY OF THE INVENTION

Therefore a need has arisen for a system and method which controls the capture of images by a camera integrated in an information handling system housing.

In accordance with the present invention, a system and method are provided which substantially reduce the disadvantages and problems associated with previous methods and systems for controlling the capture of images by a camera integrated in an information handling system housing. A mechanical shutter selectively impedes transmission of light to a camera integrated in an information handling system housing to provide a mechanical mechanism for controlling the capture of images at the camera.

More specifically, an information handling system processes information with components disposed in a housing. A video camera integrated in the housing and in communication with the components allows the capture of images as visual information available to the components, such as for transmission through a network to other information handling systems in a videoconference. A mechanical shutter dispose at the housing proximate the camera selectively impedes transmission of light to the camera in order to secure the camera from capturing images. The mechanical shutter is a non-transparent material that blocks light when moved over the camera lens. Alternatively, the mechanical shutter is a transparent material having a non-transparent treatment that blocks or otherwise impedes transmission of light. The mechanical shutter may include a visible portion that so that an end user can view the visible portion as an indicator when the camera lens is impeded by the mechanical shutter. In one embodiment, the mechanical shutter moves the camera from out of alignment with an opening of the housing so that the camera does not have access to light outside of the information handling system housing.

The present invention provides a number of important technical advantages. One example of an important technical advantage is that a mechanical shutter disposed at a housing proximate to a camera lens allows an end user to control the capture of images by the camera with a mechanical actuator. Physically blocking the lens from capturing images secures the video camera from malicious use, such as remote control by a hacker. A thin shutter structure disposed in the housing avoids an impact on housing thickness while allowing full use of available housing space for a lens assembly so that captured images have a high quality. A physical indicator that highlights the position of a shutter lets the end user know with a quick glance whether or not the video camera is physically secure.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 2 depicts a side view of a mechanical shutter in a closed position that impedes a camera from capturing images;

FIGS. 3A and 3B depict alternative embodiments of a mechanical shutter; and

FIG. 4 depicts a side view of a mechanical shutter in an open position.

DETAILED DESCRIPTION

Figure 1:
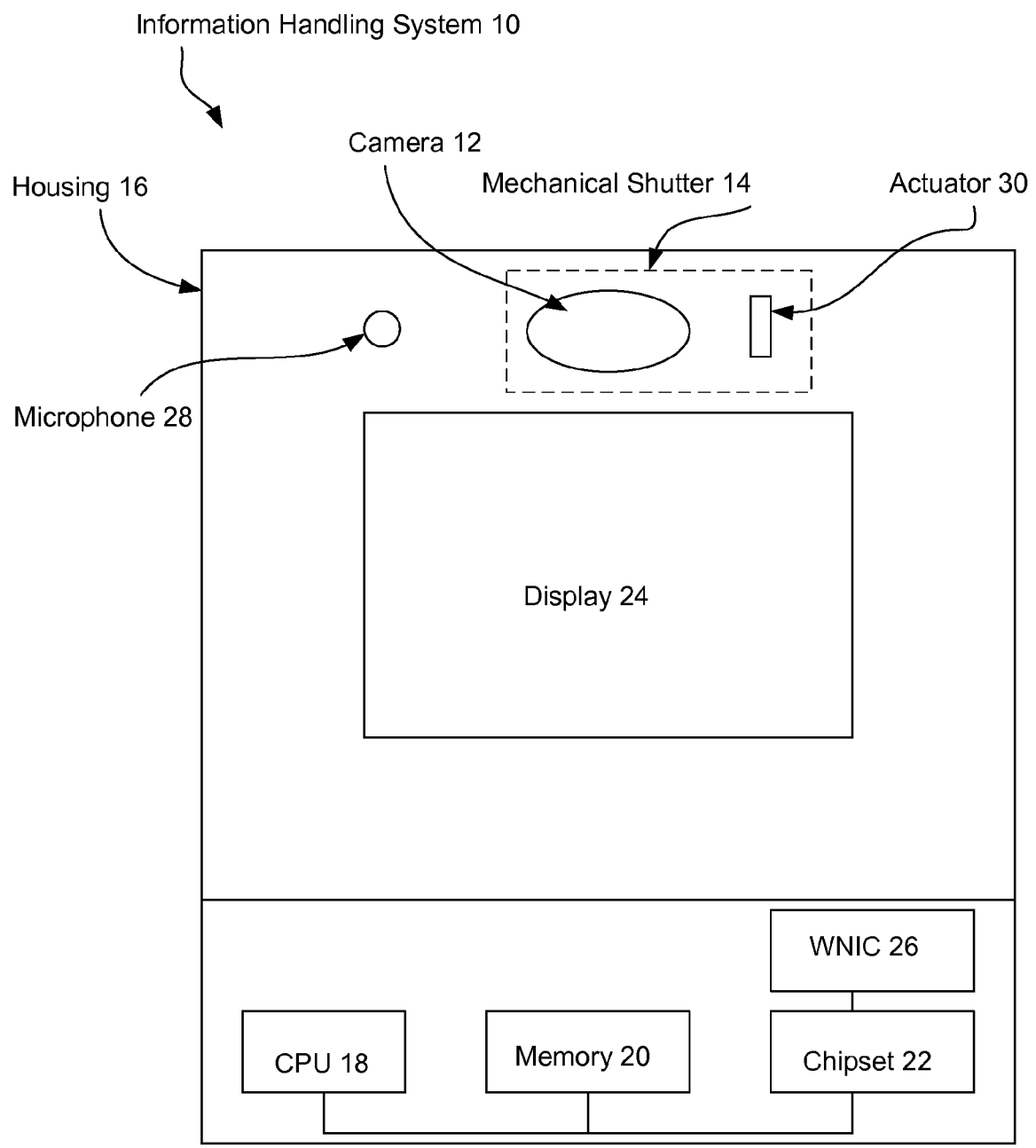
FIG. 1 depicts a block diagram of an information handling system having a camera selectively impeded from capturing images with a mechanical shutter.

A mechanical shutter selectively impedes the capture of images by an information handling system camera to provide improved security and privacy for an end user of the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to FIG. 1, a block diagram depicts an information handling system 10 having a camera 12 selectively impeded from capturing images with a mechanical shutter 14. Information handling system 10 processes information with components disposed in a housing 16. For example, an application executing on a CPU 18 and stored in memory 20 generates visual information that represents an image. A chipset 22 accepts the visual information and formats the visual information for presentation as an image by display 24. In one embodiment, the application is a videoconferencing application that communicates with another information handling system through a network interface, such as a wireless network interface card (WNIC) 26. Images and sounds from the network communications are presented at information handling system 10 while images captured by camera 12 and sounds captured by a microphone 28 are sent from information handling system 10 through WNIC 26 to a distal information handling system.

A difficulty with software-controlled operations of camera 12 is that malicious code can potentially take control of camera 12 to capture images for communication through WNIC 26 without the end user's knowledge or consent. To prevent communication of images captured by camera 12, mechanical shutter 14 impedes the transmission of light to camera 12, thus preventing the capture of meaningful images by camera 12. Mechanical shutter 14 responds to a physical input by an end user to an actuator 30 accessible at the exterior of housing 16 so that actions by malicious code executing on information handling system 10 will not override the end user's election to impede transmission of light to camera 12. In order to fit in the housing 16 without limiting the size of camera 12, mechanical shutter 14 is made of thin material, such as paper thin stainless steel shim stock or paper thin optically clear mylar film.

In one embodiment, an input at actuator 30 to mechanically impede the transmission of light also removes power from camera 12 and microphone 26. Mechanical shutter 14 can impede transmission of light to camera 12 in a variety of ways. In one embodiment, mechanical shutter 14 couples at the interior of housing 16 proximate to an opening in housing 16 through which camera 12 receives light, and actuator 30 extends through housing 16 to translate user inputs at the exterior of housing 16 to movement of mechanical shutter 14 at the interior of housing 16. In an alternative embodiment, mechanical shutter 14 couples at the exterior surface of housing 16 to cover and expose camera 12. In another embodiment, camera 12 couples to mechanical shutter 14 so that actuation of mechanical shutter 14 moves camera 12 into and out of alignment with the opening of housing 16.

Referring now to FIG. 2, a side view depicts a mechanical shutter 14 in a closed position that impedes a camera 12 from capturing images. Camera 12 is selected to have a size that will use most of the space available within the interior of housing 16 so that optics of increased size improves image quality captured by camera 12. Housing 16 has an exterior surface formed by a bezel 32 that assembles to housing 16, the bezel having an opening 34 covered by a protective lens 36. Opening 34 aligns with a lens 38 of camera 12, which gathers light passing through opening 34 using a sensor 40. Camera 12 assembles with a minimal gap for assembly tolerance in order to have a thin housing footprint with maximal camera size. A printed circuit board 42 supports sensor 40 and lens 38 and provides communication for electrical signals to the components of information handling system 10. A power source 44 provides power to run sensor 40 and microphone 26.

Mechanical shutter 14 slides with a perpendicular motion between lens 38 and protective lens 36 to selectively impede and allow transmission of light through opening 34 to sensor 40. To fit within the minimal clearance provided between protective lens 36 and lens 38, mechanical shutter 14 has minimal thickness. A slide assembly 46 interfaces mechanical shutter 14 with actuator 30 to allow an end user to slide mechanical shutter 14 relative to lens 38. For example, slide assembly 46 is a plastic injection molded piece that snaps into connectors of housing 16 and holds mechanical shutter 14 in a sliding relationship. In alternative embodiments, other types of securing mechanism may retain mechanical shutter 14 in position to translate be between open positions that allow camera use and closed positions that disallow camera use by impeding transmission of light. With actuator 30 pushed towards protective lens 36, mechanical shutter 14 blocks transmission of light to sensor 40. In addition, a power switch interface connects actuator 30 to power source 44 so that power to camera 12 and microphone 28 is removed when mechanical shutter 14 is positioned to impede light transmission to sensor 40.

Referring now to FIGS. 3A and 3B, alternative embodiments of a mechanical shutter 14 are depicted. FIG. 3A depicts mechanical shutter 14 formed from a transparent material, such as glass or plastic, and having a non-transparent treatment 50 that blocks or otherwise impede the transmission of light. For example, non-transparent treatment 50 may be a portion having red paint that covers lens 38 when mechanical shutter 14 slides treated portion 50 over lens 38. An advantage to a bright and visually apparent treatment is that an end user can detect that the camera is turned off when mechanical shutter 14 aligns treated portion 50 with opening 34. Other types of treatments that impede transmission of light include a beaded glass portion or unfocused lens portion that allow passage of light without enough clarity to form an image. FIG. 3B depicts mechanical shutter 14 made from a nontransparent material, such as sheet metal or opaque plastic, having an open portion 52 that does not impede transmission of light, such as a hole formed in the material. When camera 12 is in use, open portion 52 aligns with lens 38 to allow use of camera 12. To disable camera 12, open portion 52 is moved from alignment with opening 34 so that a non-transparent portion of mechanical shutter 14 impedes transmission of light to lens 38.

Referring now to FIG. 4, a side view depicts a mechanical shutter 14 in an open position. Slide assembly 46 supports movement of actuator 30 in a perpendicular motion relative to lens 38 so that light is allowed to transmit through opening 34 into sensor 40. In one alternative embodiment, mechanical shutter 14 is disposed beneath PCB 42 to support movement of camera 12 relative to opening 34. Perpendicular motion initiated by actuator 30 to mechanical shutter 14 translates to move camera 12 so that lens 38 is not in alignment with opening 34. As PCB 42 moves lens 38 out of alignment with opening 34, power and communications connections become decoupled to make camera 12 and microphone 26 inoperative until power and communications connections are re-coupled by movement of actuator 30 to realign lens 38 with opening 34.

Although the present invention has been described in detail, it should be understood that various changes, substitutions and alterations can be made hereto without departing from the spirit and scope of the invention as defined by the appended claims.

What is claimed is:

1. An information handling system comprising:
    a housing having an interior and an outer and inner surface, the outer surface having a camera opening;
    components disposed in the housing, the components operable to cooperate to generate visual information for presentation at a display and to process non-visual information by executing applications;
    a display disposed in the housing and interfaced with the components, the display operable to present the visual information as images;
    a camera disposed in the housing interior, the camera having a lens aligned with the camera opening, the camera interfaced with the components and operable to capture an image through the lens and to provide the image as visual information to the components; and
    a mechanical shutter disposed at the camera opening, the mechanical shutter having a sheet of material operable to slide between a closed position that impedes light from passing through the camera opening and an open position that allows light to pass through the camera opening, the mechanical shutter further comprising a power interface with the camera to power down the camera with the sheet of material in the closed position;
    wherein the components remain operable to process non-visual information by executing applications when the mechanical shutter power interface powers down the camera.

2. The information handling system of claim 1 wherein the mechanical shutter further comprises a securing mechanism coupled to the housing outer surface, the securing mechanism holding the sheet of material in a sliding relationship.

3. The information handling system of claim 1 wherein the mechanical shutter further comprises a securing mechanism coupled to the housing inner surface and disposed in the housing interior, and an actuator accessible at the outer surface for sliding the sheet of material between the closed and open positions.

4. The information handling system of claim 1 further comprising a microphone operable to capture audible sounds as audio information, wherein the power interface powers down the microphone with the sheet of material in the closed position.

5. The information handling system of claim 1 wherein the sheet of material comprises a transparent material having a non-transparent treatment aligned with the camera opening in the closed position.

6. The information handling system of claim 5 wherein the non-transparent treatment comprises red paint visible through the camera opening in the closed position.

7. The information handling system of claim 1 wherein the sheet of material comprises a non-transparent material having an opening aligned with the camera opening in the open position.

\* \* \* \* \*